United States Patent [19]
Yagi et al.

[11] Patent Number: 5,619,704
[45] Date of Patent: *Apr. 8, 1997

[54] ASYNCHRONOUS INTERRUPT INHIBIT METHOD AND APPARATUS FOR AVOIDING INTERRUPT OF AN INSEPARABLE OPERATION

[75] Inventors: Takayuki Yagi, Tokyo; Yoichiro Takeuchi, Urawa, both of Japan

[73] Assignee: Kabushiki Kaisha Toshiba, Kawasaki, Japan

[ * ] Notice: The term of this patent shall not extend beyond the expiration date of Pat. No. 5,471,595.

[21] Appl. No.: 548,473

[22] Filed: Oct. 26, 1995

Related U.S. Application Data

[63] Continuation of Ser. No. 307,050, Sep. 16, 1994, Pat. No. 5,471,595, which is a continuation of Ser. No. 863,250, Apr. 3, 1992, abandoned.

[30] Foreign Application Priority Data

Apr. 4, 1991 [JP] Japan ...................................... 3-71294

[51] Int. Cl.$^6$ ...................................................... G06F 9/40
[52] U.S. Cl. .......................... 395/735; 395/375; 395/733
[58] Field of Search ..................................... 395/375, 733, 395/735, 700, 775

[56] References Cited

U.S. PATENT DOCUMENTS

| | | | |
|---|---|---|---|
| 3,573,854 | 4/1971 | Watson | 395/375 |
| 4,392,208 | 7/1983 | Burrows et al. | 395/183.07 |
| 5,218,712 | 6/1993 | Culter et al. | 395/800 |
| 5,349,667 | 9/1994 | Kaneko | 395/740 |
| 5,408,643 | 4/1995 | Katayose | 395/185.08 |
| 5,432,943 | 7/1995 | Mitsuishi | 395/868 |
| 5,467,295 | 11/1995 | Young et al. | 395/200.05 |
| 5,485,594 | 1/1996 | Foster | 395/427 |

Primary Examiner—Kenneth S. Kim
Attorney, Agent, or Firm—Oblon, Spivak, McClelland, Maier & Neustadt, P.C.

[57] ABSTRACT

According to this invention, when a program requiring an inseparable operation is to be executed, prior to its program processing, an instruction fetch counter setting instruction is executed by an instruction fetch counter setting unit, and a value indicated by the instruction fetch counter setting instruction, i.e., an instruction count required for the program processing, is set in an instruction fetch counter. The instruction fetch counter is counted down by a count down unit every time an instruction is fetched. When an interrupt is generated, an interrupt control unit refers to the instruction fetch counter. When the reference value is "1" or more, the interrupt is inhibited until the value is set to be "0."

3 Claims, 3 Drawing Sheets

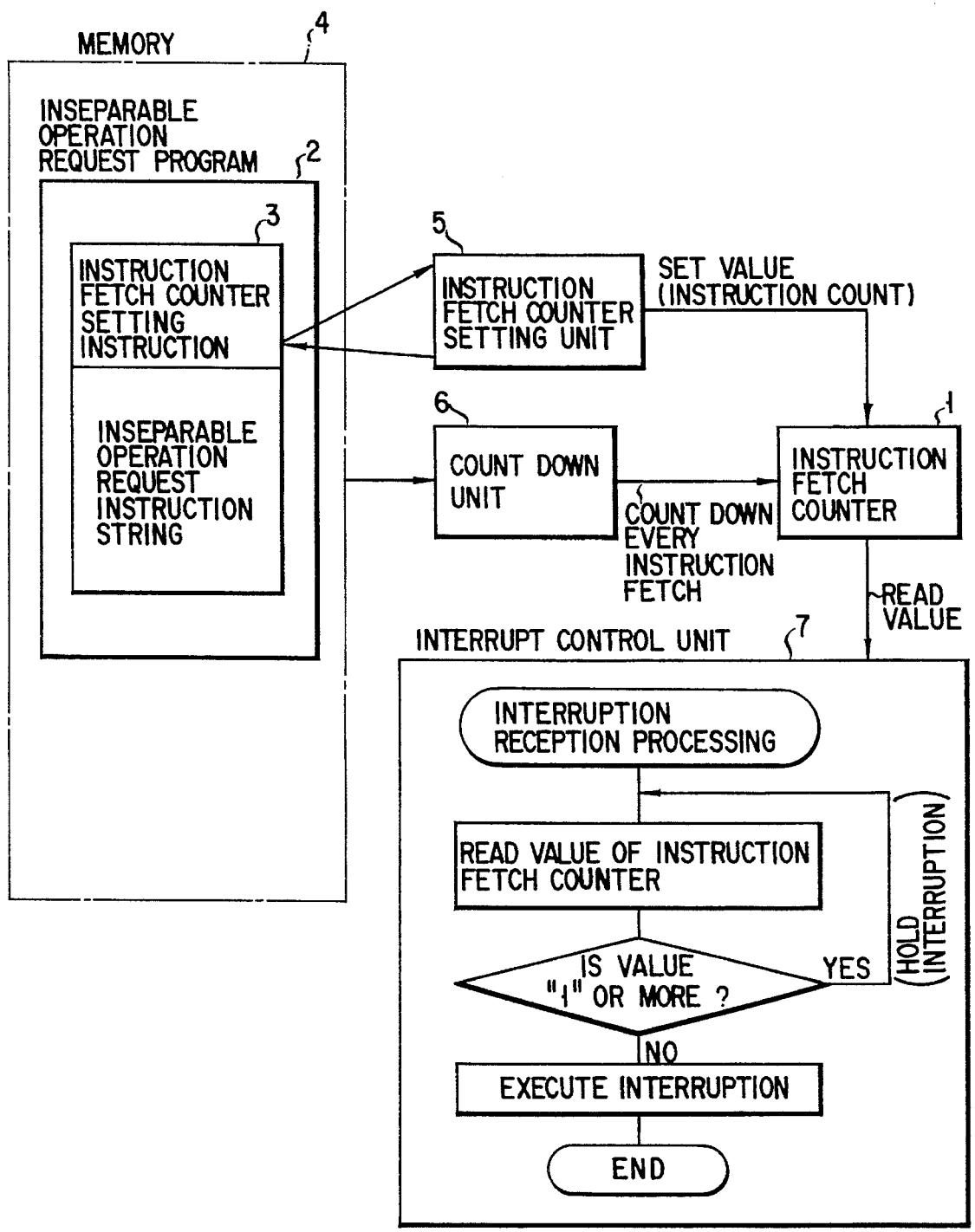
F I G. 2

ASYNCHRONOUS INTERRUPT INHIBIT METHOD AND APPARATUS FOR AVOIDING INTERRUPT OF AN INSEPARABLE OPERATION

This is a Continuation of application Ser. No. 08/307,050 filed on Sep. 16, 1994, now issued U.S. Pat. No. 5,471,595 which is a Continuation of application Ser. No. 07/863,250 filed on Apr. 3, 1992, now abandoned.

BACKGROUND OF THE INVENTION

1. Field of the Invention

The present invention relates to an information processing system using an interrupt control method and, more particularly, to an asynchronous interrupt inhibit apparatus suitable for program processing of an inseparable operation requiring interrupt (asynchronous interrupt) inhibit.

2. Description of the Related Art

In an information processing system using an interrupt control method, as one of points to which much attention is paid when a program is to be executed, there is an asynchronous interrupt such as a timer interrupt and an input/output interrupt asynchronously generated with program execution in a period of an inseparable operation.

An inseparable operation is an operation in which a plurality of commands are (consistently) sequentially performed without interruption.

An interrupt (operation error interrupt, incorrect memory reference interrupt, or the like) generated synchronously with execution of a program can be prevented from being generated as follows. That is, programing is performed such that a factor of the generation is determined in advance. However, when an asynchronous interrupt is performed during an inseparable operation, the following problems are posed.

The problems related to an inseparable operation will be described below with reference to FIG. 1. FIG. 1 shows a case wherein an interrupt is generated in a program X for setting logical AND of the contents of the memories (M1 and M2) into a register R3.

An operation performed by the program X is divided into the following three steps.

(1) The content of a memory M1 is read into a register R1.

(2) The content of a memory M2 is read into a register R2.

(3) The logical AND of the contents of the registers R1 and R2 is obtained, and the resultant value is set into the register R3.

In the program X, the following is assumed. Immediately after step (1), the interrupt shown in FIG. 1 is generated, and the contents of the memory M1 and M2 are changed during this interrupt processing.

In this case, the content of the memory M2 after the interrupt processing is ended is different from the content of the M2 in the state of step (1). Therefore, if steps (2) and (3) are performed, an inconvenient result is obtained by the interrupt processing. For this reason, the operation of steps (1) and (2) must be (consistently) sequentially performed without interruption.

When an asynchronous interrupt is generated during an inseparable operation, the above problems are posed. Therefore, an inseparable operation must be prevented from experiencing an asynchronous interrupt.

As methods of securing an inseparable operation, the following three methods are known.

The first method is a method of supporting all the inseparable operations with an instruction word. This method has the following drawbacks. That is, a hardware design amount including firmware is enormous, and a low processing speed results from the performance of the method.

The second method is a method of supporting an inseparable operation by a system call. This method has the following drawbacks. The method cannot be used in an OS (operating system), and a low processing speed results from the performance of the method.

According to the third method, an inseparable operation is ensured such that interrupt inhibit during an inseparable operating period and interrupt release (interrupt enable) are supported by an instruction word. Since the third method does not have the drawbacks of the first and second methods, the third method is relatively generally used. However, the third method has the following drawbacks. In a program in a user mode, when the program is ended in an interrupt inhibit state, an interrupt cannot be enabled to stop the system. Normally, although the inseparable operations are ended at the end of the program, the program may overrun by breaking a program pointer or the like. In this case, the program is ended without interrupt enabled, and system stop occurs.

As described above, in a conventional technique, a method for supporting interrupt inhibit during an inseparable operating period and interrupt release (interrupt enable) by an instruction word is generally used. However, the conventional method has the problem that when a program is broken by interrupt control performed by interrupt enable/inhibit instructions, the system is stopped in an interrupt inhibit state thus causing an adverse influence on the system.

SUMMARY OF THE INVENTION

It is an object of the present invention to provide an asynchronous interrupt inhibit apparatus in which a user can perform a series of inseparable operations in an asynchronous interrupt inhibit state without causing an adverse influence on the rest of the system, a hardware design amount including firmware can be reduced, and a high-speed operation can be performed.

According to the present invention, an asynchronous interrupt inhibit apparatus includes: an instruction fetch counter for, prior to an inseparable operation requiring interrupt inhibit, storing a value corresponding to an instruction count required for the inseparable operation; a section for executing decrement of the value stored in the instruction fetch counter every time an instruction is fetched; and an instruction control section for inhibiting/enabling an interrupt on the basis of the value stored in the instruction fetch counter.

With the above arrangement, the asynchronous interrupt inhibit apparatus according to the present invention performs the following operations.

When processing requiring an inseparable operation is to be performed, prior to the processing, an instruction count required for the processing and designated by, e.g., a specific instruction, is set in an instruction fetch counter by a specific instruction executing section (setting section). The instruction fetch counter is counted down upon every instruction fetch, and an inseparable operation is required in a period in which the value of the instruction fetch counter is set to be "1" or more. In a period in which instruction fetches of an instruction count required for the processing are completed, an interrupt performed by an interrupt control section, i.e., an asynchronous interrupt, is inhibited. When the last instruction of the processing requiring an inseparable operation is fetched, the value of the instruction fetch counter is "0," and an interrupt inhibit state is automatically released by the interrupt control section.

According to the present invention, the inhibit/enable of an interrupt is not set in an instruction for performing the processing but is controlled by the value of the instruction fetch counter. Therefore, if a program is broken in an interrupt inhibit state, after instruction fetches of the set instruction count are completed, the interrupt inhibit is automatically released, and interrupt processing can be started. Therefore, according to the present invention, an adverse influence to the rest of the system can be prevented, and the reliability of the system can be improved.

Furthermore, since the inhibit/enable of an interrupt can be controlled by the value of an instruction fetch counter, a hardware design amount including firmware can be smaller than that of a conventional method of supporting an inseparable operation by an instruction word or a conventional method of supporting an inseparable operation by a system call, and the processing speed thereof can be increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram shown an arrangement of an asynchronous interrupt inhibit apparatus according to an embodiment of the present invention.

DETAILED DESCRIPTION OF THE PREFERRED EMBODIMENTS

Figure 1:
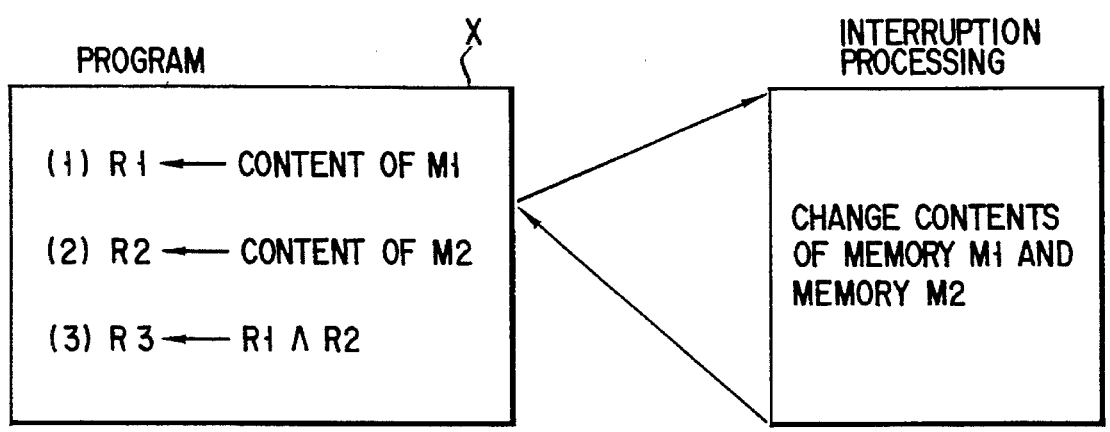
FIG. 1 is a view showing a program requiring an inseparable operation.

An embodiment of the present invention will be described below with reference to the accompanying drawings.

FIG. 2 is a block diagram showing the arrangement of an asynchronous interrupt inhibit apparatus according to an embodiment of the present invention.

The interrupt inhibit apparatus shown in FIG. 2 is arranged in an information processing system using an interrupt control method. Referring to FIG. 2, in a program (inseparable operation request program) 2, it is assumed that an instruction string (inseparable operation request instruction string) in which operations must be sequentially performed without interruption, and a specific instruction (to be referred to as "instruction fetch counter setting instruction") 3 for setting the instruction count (instruction count required for performing an inseparable operation) of an inseparable operation in an instruction fetch counter 1, prior to the execution of the instruction string (an inseparable operation), are prepared in advance. A memory 4 is a main memory, an instruction cache, an instruction buffer, or the like, and the memory 4 stores various programs such as the inseparable operation request program 2. As the inseparable operation request program 2, a program obtained by inserting an instruction of an inseparable operation into a program during a compiling operation may be used, or a program which inserts a code calling a program containing an instruction fetch counter setting instruction may be used.

The apparatus of the present invention includes an instruction fetch counter 1 representing an asynchronous interrupt inhibit state, an instruction fetch counter setting unit 5 for performing the instruction fetch counter setting instruction 3 and setting a value, e.g., a value of 1 or more, designated by the instruction fetch counter set instruction 3, a count down unit 6 for executing decrement of the value of the instruction fetch counter 1 every time an instruction is fetched from the memory 4, and an interrupt control unit 7. The interrupt control unit 7 controls an interrupt, i.e., an asynchronous interrupt, to be inhibited or held in a period in which the value of the instruction fetch counter 1 is set to be "1" or more.

An operation of the arrangement of FIG. 2 will be described below.

In the inseparable operation request program 2 requiring an inseparable operation, the instruction fetch counter setting instruction 3 is immediately followed by the inseparable operation request instruction string. Therefore, before the inseparable operation request instruction string is executed, the instruction fetch counter setting instruction 3 (stored in the memory 4) is fetched from the inseparable operation request program 2.

In the instruction fetch counter setting instruction 3, a value representing the instruction count (instruction count required for an inseparable operation) of the inseparable operation request instruction string is set in advance. When the instruction fetch counter setting instruction 3 is fetched from the inseparable operation request program 2, the instruction fetch counter setting unit 5 executes the instruction fetch counter setting instruction 3 and sets a value set in the instruction fetch counter setting instruction 3 in the instruction fetch counter 1.

When the instruction fetch counter setting instruction 3 is executed, the instructions of the inseparable operation request instruction string constituting a main part of the inseparable operation request program 2 are sequentially fetched and executed from the start instruction read out from the memory 4, a series of inseparable operations are performed.

In the inseparable operations, in accordance with the execution of the inseparable operation request program 2, the count down unit 6 increments the value of the instruction fetch counter 1 one by one every time an instruction is fetched from the memory 4.

When an interrupt, i.e., an asynchronous interrupt, is generated, the interrupt control unit 7 refers to the instruction fetch counter 1 before the interrupt is performed. When the value of the instruction fetch counter is set to be "1" or more, it is assumed that the period of an inseparable operation is set, and the interrupt control unit 7 inhibits or holds the interrupt until the value of the instruction fetch counter is set to be "0," i.e., until all the instructions of the inseparable operation request string of the inseparable operation request program 2 which is executed are fetched. Therefore, in the example in FIG. 1, when the instruction fetch counter 1 is set to be a value of immediately before the program X, the operational consistency of the two instructions of steps (1) and (2) can be ensured.

Figure 3A:
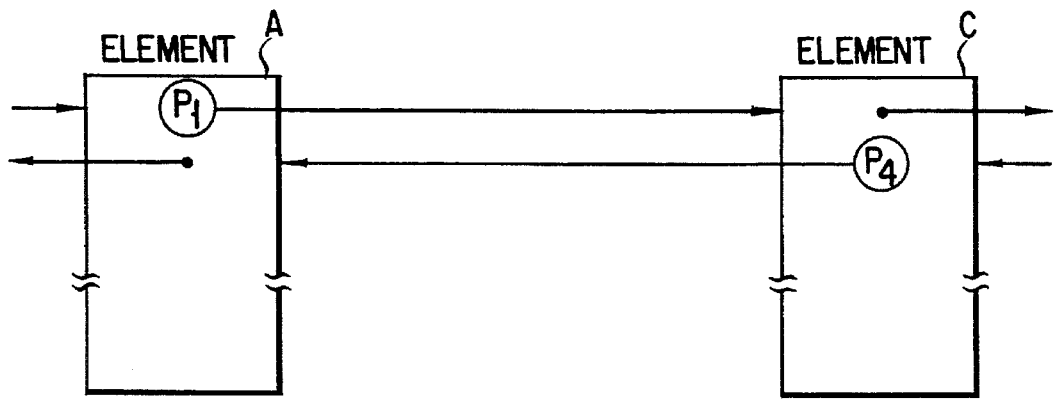
FIGS. 3A, 3B, and 3C are each views for explaining a relationship between a bidirectional queue operating program and a pointer updating portion requiring an inseparable operation when an element is inserted between two elements connected to a bidirectional queue.
Figure 3B:
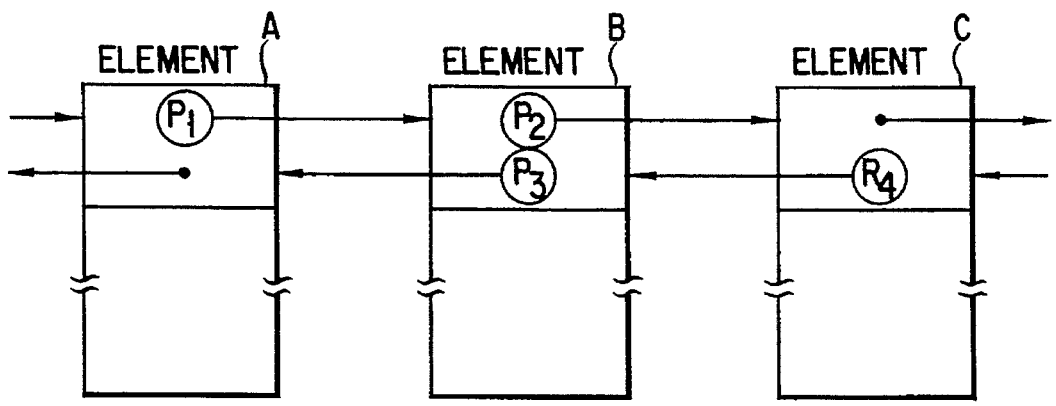

The above asynchronous interrupt inhibit technique can be applied when an element is inserted between two elements connected to a bidirectional queue for managing, e.g., a task. According to this embodiment, processing for inserting an element B shown in FIG. 3B between element elements A and C connected to a bidirectional queue as shown in FIG. 3A will be exemplified.

Figure 3C:
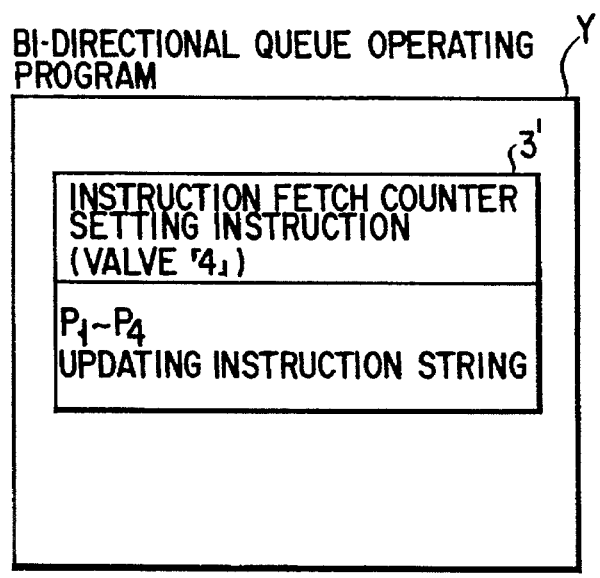

In order to insert an element B between the elements A and C, as is apparent from FIG. 3, an inseparable operation for continuously and consistently updating backward pointers (a pointer indicating an element which follows the element of the pointer) P1 and P2 of the elements A and B and forward pointers (a pointer indicating an element which is followed by the element of the pointer) P3 and P4 is required. In this case, as shown in FIG. 3C, in a bidirectional queue operating program Y, only an instruction fetch counter setting instruction 3' for inhibiting an interrupt until four instructions for updating the pointers P1 to P4 are completely fetched, i.e., the instruction fetch counter setting instruction 3' which is executed prior to the four instructions for updating the pointers P1 to P4 and which instructs to set the values of the four instructions in the instruction fetch counter 1, is prepared.

With the above arrangement, interrupts of the four instructions for updating the pointer P1 to P4 following the instruction fetch counter setting instruction 3' are inhibited. Even if an asynchronous interrupt processing routine is operated during the operation of the bidirectional queue to access the same queue as described above, the interrupts are inhibited or held until the four instructions for updating the pointer P1 to P4 are fetched, i.e., the operation of the asynchronous interrupt processing routine is permitted to continue to completion. Therefore, the data structure of the bidirectional queue is consistently maintained.

As described above, in the asynchronous interrupt inhibit apparatus according to the present invention, until a period in which instructions of the count designated by the counter setting instruction 3 (3') are completely fetched, an interrupt can be automatically inhibited. Therefore, when the asynchronous interrupt inhibit apparatus of the present invention is applied to a computer using, e.g., an RISC (Reduced Instruction Set Computer) method, and a high-performance processing primitive is realized by the combination of a plurality of basic instructions, the asynchronous interrupt inhibit apparatus is effectively used. For this reason, a hardware design amount including firmware can be considerably reduced.

The present invention is not limited to the above embodiment. For example, in this embodiment, the instruction fetch counter setting unit 5, the instruction fetch counter 1, and the count down unit 6 are formed by independent units. However, these units are arranged in one circuit. In addition, various changes and modifications may be effected without departing from the spirit and scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An asynchronous interrupt inhibit apparatus comprising:

fetch means for storing a value corresponding to a number of steps included in an inseparable operation; and control means for inhibiting an interrupt of the inseparable operation after starting the inseparable operation until the number of steps equal to said value stored in said fetch means are executed.

2. An asynchronous interrupt inhibit apparatus for controlling activation and deactivation of an interrupt condition whereby a series of sequential instructions is interrupted, comprising:

determining means for determining a value corresponding to a number of sequential instructions included in an inseparable operation;

counter means for storing the determined value corresponding to the number of sequential instructions included in the inseparable operation;

means for counting until a count reaches said value stored in said counter means each time an instruction included in said separable operation is executed; and interrupt inhibiting means for activating said interrupt inhibit condition during execution of said series of sequential instruction of said inseparable operation.

3. A method for inhibiting an interrupt condition during execution of a series of sequential instructions comprising:

determining a number of sequential instructions included in an inseparable operation;

storing a value corresponding to said number of sequential instructions in a fetch counter;

executing said sequential instructions of the inseparable operation;

counting until a count reaches said value stored in said fetch counter each time an instruction included in said inseparable operation is executed; and controlling activation and deactivation of said interrupt condition by maintaining an interrupt inhibit state while said inseparable operation is being executed, and allowing activation of said interrupt condition only when said value reaches a predetermined number.

* * * * *